United States Patent [19]
Fuse et al.

[11] Patent Number: 6,078,412
[45] Date of Patent: Jun. 20, 2000

[54] OPTICAL TRANSMITTER AND OPTICAL TRANSMISSION SYSTEM USING THE SAME

[75] Inventors: Masaru Fuse, Toyonaka; Kuniaki Utsumi, Sanda, both of Japan

[73] Assignee: Matsushita Electric Industrial Co., Ltd., Osaka-fu, Japan

[21] Appl. No.: 08/724,835

[22] Filed: Oct. 3, 1996

[30] Foreign Application Priority Data

Mar. 10, 1995 [JP] Japan .................................. 7-256146

[51] Int. Cl.⁷ .................................................. H04J 14/02
[52] U.S. Cl. ........................................ 359/124; 359/181
[58] Field of Search .................................. 359/124–125, 359/133, 173, 181, 188; 370/480, 497

[56] References Cited

U.S. PATENT DOCUMENTS

| | | | |
|---|---|---|---|
| 5,016,242 | 5/1991 | Tang ........................................ | 359/124 |
| 5,351,148 | 9/1994 | Maeda et al. ............................. | 359/124 |

*Primary Examiner*—Kinfe-Michael Negash
*Attorney, Agent, or Firm*—Wenderoth, Lind & Ponack, L.L.P.

[57] ABSTRACT

In a system for simultaneously optically transmitting a plurality of digital modulation signals using an analog SCM transmission technique, the degree of degradation of the waveform of a transmission signal or the magnitude of distortion thereof differs depending on bands, whereby there arises a difference in transmission quality among channels. Therefore, an analog signal to be transmitted is converted into a digital signal by an analog-to-digital converting portion, after which the digital signal is divided, by a hierarchy separating portion, into a plurality of groups of digital information depending on degrees of importance in constructing the original analog signal. A modulating portion digitally modulates carriers having different frequencies which are respectively assigned to the groups of digital information. A multiplexing portion frequency-multiplexes and simultaneously optically transmits all the digital modulation signals. In this case, the carrier corresponding to the digital information having a higher degree of importance is set on a lower frequency side, and the carrier corresponding to the digital information having a lower degree of importance is set on a higher frequency side. Consequently, it is possible to minimize the effect of the degradation and the distortion caused in the transmission on received and reproduced data, whereby high-quality transmission is possible.

19 Claims, 12 Drawing Sheets

6,078,412

OPTICAL TRANSMITTER AND OPTICAL TRANSMISSION SYSTEM USING THE SAME

BACKGROUND OF THE INVENTION

1. Field of the Invention

The present invention relates to an optical transmission system, and more particularly, to a system for optically transmitting a digital modulation signal obtained by frequency-multiplexing.

2. Description of the Prior Art

FIG. 9 is a diagram showing a first example of a conventional optical transmission system. In FIG. 9, the optical transmission system includes an analog-to-digital converting portion 901, a digital modulating circuit 903, an electrical-optical converting portion 905, an optical transmission channel 906, an optical-electrical converting portion 907, a transmission channel 908, a demodulating portion 9100, and a digital-to-analog converting portion 913. The demodulating portion 9100 includes a filter 910 and a digital demodulating circuit 911.

Description is now made of operations of the conventional optical transmission system shown in FIG. 9. The analog-to-digital converting portion 901 samples and quantizes an analog signal, such as an image signal, and converts the sampled and quantized analog signal into a digital signal. The digital modulating circuit 903 converts the digital signal into a digital modulation signal by a predetermined digital modulation system using a carrier having a predetermined frequency $f_0$, and outputs the digital modulation signal. The digital modulation signal is converted into an optical signal in the electrical-optical converting portion 905, and the optical signal is transmitted by the optical transmission channel 906, and is then reconverted into an electrical signal in the optical-electrical converting portion 907. In the demodulating portion 9100, the digital modulation signal, having the frequency $f_0$ and which was passed through the filter 910, is converted into a digital signal by the digital demodulating circuit 911. The digital-to-analog converting portion 913 reconverts the digital signal into an analog signal. Examples of the above-mentioned predetermined digital modulation system include a 16 QAM modulation system. In this case, it is generally possible to ensure a transmission capacity of several tens of megabytes per second.

FIG. 10 is a diagram showing a second example of a conventional optical transmission system. In FIG. 10, the optical transmission system includes an analog-to-digital converting portion 901, a dividing portion 1002, a modulating portion 1003, a multiplexing portion 1004, an electrical-optical converting portion 905, an optical transmission channel 906, an optical-electrical converting portion 907, a transmission channel 908, a branching portion 1009, a demodulating portion 1010, a synthesizing portion 1012, and a digital-to-analog converting portion 913. The modulating portion 1003 includes a first digital modulating circuit 10031 and a second digital modulating circuit 10032. The demodulating portion 1010 includes a first filter 10101, a second filter 10102, a first digital demodulating circuit 10111, and a second digital demodulating circuit 10112.

Description is now made of operations of the conventional optical transmission system shown in FIG. 10. This example illustrates a construction in a case where the transmission rate is higher than that in the above-mentioned first conventional system. In this example, two carriers having predetermined frequencies $f_1$ and $f_2$, which differ from each other, are used to transmit one signal. Specifically, the dividing portion 1002 divides a digital signal, after analog-to-digital conversion, into two groups of digital information (first digital information $J_1$ and second digital information $J_2$) in accordance with a predetermined dividing method. The first digital modulating circuit 10031 and the second digital modulating circuit 10032 in the modulating portion 1003 respectively convert the two groups of digital information, obtained by the division, into digital modulation signals using two independent carriers, having frequencies $f_1$ and $f_2$. The multiplexing portion 1004 frequency-multiplexes the digital modulation signals to obtain one signal.

The signal transmitted through the electrical-optical converting portion 905, the optical transmission channel 906, the optical-electrical converting portion 907, and the transmission channel 908 is branched into two signals in the branching portion 1009, after which the signals are respectively inputted to the first filter 10101 and the second filter 10102 in the demodulating portion 1010. The first digital demodulating circuit 10111 demodulates the first digital modulation signal (having the frequency $f_1$) which was passed through the first filter 10101 to yield the first digital information $J_1$. Likewise, the second digital demodulating circuit 10112 demodulates the second digital modulation signal (having the frequency $f_2$) which was passed through the second filter 10102 to yield the second digital information $J_2$. The synthesizing portion 1012 synthesizes the first and second digital information $J_1$ and $J_2$ in accordance with a process which is reverse to the above-mentioned predetermined dividing method used in the dividing portion 1002, to reproduce a digital signal. Examples of the predetermined dividing method include a method of dividing a digital signal into two groups of digital information every other sample. As described in the first conventional example, there is a limit on the capacity of the digital modulation signal which can be transmitted by one carrier. In this example, therefore, a digital signal, which is to be transmitted, is divided into a plurality of (two in FIG. 10) groups of information, and the groups of information are respectively converted into digital modulation signals using independent carriers. The digital modulation signals are frequency-multiplexed and are together optically transmitted together, thus ensuring a higher transmission rate (which is twice that in the first conventional example).

FIG. 11 is a diagram showing a third example of a conventional optical transmission system. In FIG. 11, the optical transmission system includes first to third analog-to-digital converting portions 11011 to 11013, a dividing portion 1102, first to third modulating portions 11031 to 11033, a channel multiplexing portion 1104, an electrical-optical converting portion 905, an optical transmission channel 906, an optical-electrical converting portion 907, a transmission channel 908, a channel branching portion 1109, first to third demodulating portions 11101 to 11103, a synthesizing portion 1112, and first to third digital-to-analog converting portions 11131 to 11133.

Description is now made of operations of the conventional optical transmission system shown in FIG. 11. The above-mentioned first and second conventional systems are for transmission on one channel, while the third conventional system is for transmission on a plurality of channels (three channels in FIG. 11). In this conventional example, signals on three channels $C_1$, $C_2$ and $C_3$ are subjected to digital modulation using carriers having different frequencies $f_1$, $f_{21}$, $f_{22}$ and $f_3$ which are previously assigned. The modulated signals are frequency-multiplexed and are optically transmitted together, as shown in FIG. 12, for example.

In this third conventional example, therefore, an analog-to-digital converting portion, a modulating portion, a demodulating portion, and a digital-to-analog converting portion are provided so as to correspond to each of the three transmission signals $C_1$, $C_2$ and $C_3$. The channel multiplexing portion 1104 frequency-multiplexes digital modulation signals outputted from all the modulating portions 11031 to 11033. The channel branching portion 1109 branches a signal, which is obtained by the frequency-multiplexing and which is optically transmitted through the electrical-optical converting portion 905 to the transmission channel 908, and respectively inputs signals obtained by the branching to all the demodulating portions 11101 to 11103. In FIG. 11, only the signal on the second channel $C_2$ requires a high transmission rate. Therefore, the dividing portion 1102 and the synthesizing portion 1112 are provided on the second channel, and transmission is made using the two carriers (having the frequencies $f_{21}$ and $f_{22}$). Detailed operations of components are the same as those in the first and second conventional examples and hence, the detailed description thereof is omitted.

A system using an analog SCM (Sub-Carrier Multiplex) transmission technique for optically transmitting a signal obtained by frequency-multiplexing using a plurality of carriers as described above is effective as a system capable of easily transmitting information at a high bit rate and on multi-channels. However, a transmission system (including an electrical-optical converting portion, an optical transmission channel, an optical-electrical converting portion, and a transmission channel) generally has frequency characteristics which make it difficult to obtain transmission qualities which are equal and uniform over the entire transmission band. For example, a light source for direct modulation (a semiconductor laser) used for an electrical-optical converting portion exhibits a larger amount of waveform distortion at higher modulation frequencies. This characteristic is due to the effect of the laser's relaxation oscillation frequency. Therefore, degradation of the waveform of a digital modulation signal having a high carrier frequency is larger than degradation of the waveform of a digital modulation signal having a low carrier frequency, whereby the transmission quality such as BER (a bit error rate) is degraded. Further, when the number of transmission channels is large, second order distortion is large in the vicinity of the center of the transmission band, while third order distortion is large in the upper and lower parts of the transmission band.

In the conventional optical transmission system for transmitting a plurality of digital modulation signals using the analog SCM transmission technique as described above, the degree of degradation of the waveform of a transmission signal or the magnitude of distortion thereof differs depending on the carrier frequency, whereby there arises a difference in transmission quality among channels.

The above-mentioned problems not only arise in when an analog signal is converted into a digital signal and the digital signal is transmitted, but also when digital data is multiplexed and optically transmitted.

SUMMARY OF THE INVENTION

Therefore, an object of the present invention is to provide an optical transmission system and an optical transmission apparatus capable of minimizing the effect of irregularities of transmission characteristics in the entire transmission band on received and reproduced information and to avoid differences in signal quality among channels.

Another object of the present invention is to provide an optical transmission system and an optical transmission apparatus capable of keeping the quality of a signal reproduced on a receiving side as good as possible even when all information on all channels cannot be transmitted or received.

In order to attain the above-mentioned objects, the present invention has the following characteristics.

A first aspect of the present invention is directed to an optical transmission system for optically transmitting a digital modulation signal obtained by frequency-multiplexing. The system includes a hierarchy separating portion for dividing a digital signal into n digital signals according to an n level hierarchy (n is a natural number of not less than two). The signal is divided on the basis of the degree of importance of aspects of the signal in constructing the original data. The division is accomplished in accordance with a predetermined hierarchical system. The digital signals are output as first to nth digital information arranged in descending order of degrees of importance. A modulating portion digitally modulates first to nth carriers having different frequencies. The first to nth carriers are assigned to the first to nth digital information respectively. The first to nth carriers are modulated with the first to nth digital information respectively. The modulating portion then outputs the first to nth digital modulation signals. A multiplexing portion frequency-multiplexes the first to nth digital modulation signals which are output from the modulating portion. An electrical-optical converting portion converts an electrical signal, which is output from the multiplexing portion, into an optical signal. An optical transmission channel transmits the optical signal which is output from the electrical-optical converting portion. An optical-electrical converting portion reconverts the optical signal, which is transmitted by the optical transmission channel, into an electrical signal. The electrical signal, which is output from the optical-electrical converting portion is transmitted through a transmission channel. A branching portion branches the electrical signal, which is transmitted through the transmission channel, into m (m is a natural number satisfying $1 \leq e\ m \leq e\ n$) electrical signals. A demodulating portion demodulates the m electrical signals, which are output from the branching portion and outputs first to mth digital information selected out of the first to nth digital information. A hierarchy synthesizing portion, to which the first to m digital information are inputted, synthesizes the digital information to form a digital signal in accordance with a process reverse to that in the predetermined hierarchical system. The hierarchy synthesizing portion then outputs the digital signal. As described in the foregoing first aspect, the digital signal to be transmitted is divided into a plurality of levels of digital information within a hierarchy depending on degrees of importance in constructing the original data. The carriers having different frequencies which are respectively assigned to the hierarchy levels are digitally modulated by the respective digital information, and all the digital modulation signals are frequency-multiplexed and are together optically transmitted. Further, the respective digital modulation signals are demodulated with respect to the electrical signal obtained by reconversion after the optical transmission, and the respective groups of digital information are synthesized, to reproduce the original digital signal.

According to the first aspect, therefore, transmission information can be subjected to various operations or transmission control depending on degrees of importance in constructing a transmission signal. As a result, it is possible to realize an optical transmission system which is high in quality, low in cost and superior in the possibility of development.

A second aspect of the present invention is characterized n that in the first aspect, when n>m, the demodulating portion respectively demodulates the m electrical signals output from the branching portion and outputs the first to mth digital information selected in descending order of degrees of importance out of the first to nth digital information.

When the capacity of an optical transmission channel is small, and the capability of a receiver is low, digital information of all hierarchies cannot, in some cases, be transmitted or received. In such a case, in the second aspect, the information having a high degree of importance is transmitted or received by priority, in order to minimize the effect on reproduced data.

A third aspect of the present invention is characterized in that in the first aspect, in the entire transmission band of a transmission line (which includes the electrical-optical converting portion, the optical transmission channel, the optical-electrical converting portion and the transmission channel), the carrier which is assigned to the digital information having a higher degree of importance out of the first to nth carriers is arranged in a band whose transmission characteristics are better, and the carrier which is assigned to the digital information having a lower degree of importance is arranged in a band whose transmission characteristics are worse.

As described in the foregoing, when a signal obtained by frequency-multiplexing is transmitted using an optical transmission channel, the degree of degradation of the waveform of the signal or the magnitude of distortion thereof differs depending on bands used. In the third aspect, therefore, the information of the hierarchy having a high degree of importance is transmitted in a band whose transmission characteristics are good, and the information of the hierarchy having a low degree of importance is transmitted in a band whose transmission characteristics are bad, so as to minimize the effect of the degradation and the distortion caused at the time of transmission on data reproduced on the receiving side. Consequently, high-quality transmission is possible.

A fourth aspect of the present invention is characterized in that in the third aspect, the digital signal is a digital signal having w bits (w is a natural number not less than n). The hierarchy separating portion divides the digital signal having the w bits into first to nth digital information such that the first to nth digital information include one or more of the w bits and such that the first to nth digital information are arranged in the order from the most significant bit to the least significant bit. The carrier which is assigned to the digital information to which the bit closest to the most significant bit belongs is arranged in a band whose transmission characteristics are better, and the carrier which is assigned to the digital information to which the bit closest to the least significant bit belongs is arranged in a band whose transmission characteristics are worse in the entire transmission band of the optical transmission line.

As described in the foregoing, in the fourth aspect, the digital signal having a plurality of bits is hierarchically divided every one or more bits into the first to n digital information. The high order bit digital information having a high degree of importance in constructing data is transmitted in a band whose transmission characteristics are good, and the low order bit digital information having a low degree of importance in constructing data is transmitted in a band whose transmission characteristics are bad. Consequently, high-quality transmission is possible.

A fifth aspect of the present invention is characterized in that in the third aspect, the hierarchy separating portion subjects the digital signal to predetermined time/frequency conversion and divides the digital signal into first to nth digital information in the order from a lowest frequency component, i.e., a component near a DC component, to the highest frequency component. The carrier which is assigned to the digital information to which a component close to the DC component belongs is arranged in a band whose transmission characteristics are better, and the carrier which is assigned to the digital information to which a component close to the highest frequency component belongs is arranged in a band whose transmission characteristics are worse in the entire transmission band of the optical transmission channel.

As described in the foregoing, in the fifth aspect, the digital signal is subjected to predetermined time/frequency conversion, and the digital signal is divided into first to nth digital information in the order from a lowest frequency component to a highest frequency component. The digital information having a high degree of importance in constructing the data, i.e., the digital information to which a component close to the DC component belongs, is transmitted in a band whose transmission characteristics are good, and the digital information having a low degree of importance in constructing data, i.e., the digital information to which a component close to the highest frequency component belongs, is transmitted in a band whose transmission characteristics are bad. Consequently, high-quality transmission is possible.

A sixth aspect of the present invention is characterized in that, in the fifth aspect, the hierarchy separating portion subjects the digital signal to Fourier transform as the predetermined time/frequency conversion.

A seventh aspect of the present invention is characterized in that, in the fifth aspect, the hierarchy separating portion subjects the digital signal to discrete cosine transform (DCT) as the predetermined/time frequency conversion.

An eighth aspect of the present invention is characterized in that, in the third aspect, the band whose transmission characteristics are better is a lower frequency band, and the band whose transmission characteristics are worse is a higher frequency band in the entire transmission band of the transmission line.

As described in the foregoing, generally in an optical transmission system, the waveform of a digital modulation signal having a high carrier frequency is greatly degraded. In the eighth aspect, therefore, the low frequency band is used as a band where digital information having a high degree of importance is to be transmitted, and the high frequency band is used as a band where digital information having a low degree of importance is to be transmitted.

When degradation of the waveform caused by distortion of a particular degree is taken up as a problem, a band whose transmission characteristics are bad is not necessarily located in a high band. Bands other than the high band may, in some cases, be used in order to transmit digital information having a low degree of importance. For example, third order distortion higher in an intermediate band in the entire transmission band. When degradation of the waveform caused by the third order distortion is a problem, the digital information having a low degree of importance is transmitted using the intermediate band. On the other hand, second order distortion is higher in a high band and a low band in the entire transmission band. When degradation of the waveform caused by the second order distortion is a problem, the digital information having a low degree of importance is transmitted using the high band or the low band.

A ninth aspect of the present invention is characterized in that in the first aspect, p sets of elements are provided and each set includes a hierarchy separating portion, a demodulating portion, and a hierarchy synthesizing portion. The p sets of elements correspond to digital signals on p channels respectively (p is a natural number of not less then two). The multiplexing portion frequency-multiplexes all digital modulation signals which are output from the p sets of modulating portions, and the branching portion branches the electrical signal transmitted by the transmission channel and inputs electrical signals obtained as a result of the branching into the p sets of demodulating portions. In this way, the digital signals on the p channels are frequency-multiplexed and are together optically transmitted.

As described in the foregoing, in the ninth aspect, the p sets of hierarchy separating portions, modulating portions, demodulating portions and hierarchy synthesizing portions are provided, to frequency-multiplex and together optically transmit the digital signals on the p channels. Consequently, the transmission capability is further increased.

A tenth aspect of the present invention is characterized by further including, in the ninth aspect, an optical branching portion arranged on the optical transmission channel for branching the optical signal into q (q is a natural number of not less than two) optical signals, and q optical receiving sets. Each of the q receiving sets includes an optical-electrical converting portion, a transmission channel, and a branching portion. Also, p sets of demodulating portions and p sets of hierarchy synthesizing portions are provided so as to correspond to the q optical signals obtained as a result of the branching in the optical branching portion.

As described in the foregoing, in the tenth aspect, the optical signal on the optical transmission channel is divided into q optical signals, thereby to make it possible to simultaneously distribute the q optical signals among a plurality of receivers.

An eleventh aspect of the present invention is characterized in that, in the tenth aspect, the condition of n>m holds in at least one of the q optical receiving sets. That is, in the one optical receiving set, the digital information of all the hierarchies cannot be demodulated for reasons such as lack of the receiving capability. Therefore, the digital information of the hierarchy having a high degree of importance is demodulated, thereby to obtain reproduced data which is as high in quality as possible.

A twelfth aspect of the present invention is characterized by further including, in the ninth aspect, an electrical distributing portion for branching an output signal from the optical-electrical converting portion into t (t is a natural number of not less then two) electrical signals, and t optical receiving sets. Each of the t optical receiving sets includes a transmission channel, and a branching portion. Also, p sets of demodulating portions, and p sets of hierarchy synthesizing portions are provided so as to correspond to the t electrical signals obtained as a result of the branching in the electrical distributing portion.

As described in the foregoing, in the twelfth aspect, the output signal from the optical-electrical converting portion is branched into t electrical signals, thereby to make it possible to simultaneously distribute the t electrical signals among a plurality receivers.

A thirteenth aspect of the present invention is characterized in that, in the twelfth aspect, the condition of n>m holds in at least one of the t optical receiving sets. That is, in the one optical receiving set, the digital information of all the hierarchies cannot be demodulated for reasons such as lack of the receiving capability. Therefore, the digital information of the hierarchy having a high degree of importance is demodulated, thereby to obtain reproduced data which is as high in quality as possible.

A fourteenth aspect of the present invention is characterized in that, in the ninth aspect, the entire transmission band of the transmission line (which includes the electrical-optical converting portion, the optical transmission channel, the optical-electrical converting portion and the transmission channel) is divided into first to nth information transmission bands from a low band to a high band, p carriers having different frequencies are set in each of the bands, and the first to nth carriers, which are respectively assigned to the digital signals on the p channels, are picked up one at a time from the carriers in the first to nth information transmission bands.

As described in the foregoing, in the fourteenth aspect, when the digital signals on the p channels are simultaneously optically transmitted, the entire transmission band of the optical transmission channel is divided into first to nth information transmission bands from a low band to a high band, and the p carriers having different frequencies are respectively set in each of the bands. The first to nth carriers which are respectively assigned to the digital signals on the p channels are picked up one at a time from the carriers in the first to nth information transmission bands.

A fifteenth aspect of the present invention is characterized by further including, in the first aspect, an analog-to-digital converting portion for converting an analog signal into a digital signal and for inputting the digital signal to the hierarchy separating portion, and a digital-to-analog converting portion for reconverting the digital signal output from the hierarchy synthesizing portion into an analog signal.

As described in the foregoing, in the fifteenth aspect, the analog signal such as an image signal or a voice signal is converted into the digital signal, after which the digital signal is optically transmitted.

A sixteenth aspect of the present invention is directed to an optical transmission apparatus for converting a digital modulation signal obtained by frequency-multiplexing into an optical signal and transmitting the optical signal onto an optical transmission channel, which includes a hierarchy separating portion for dividing a fed digital signal into digital signals in n (n is a natural number of not less than two) hierarchies depending on degrees of importance in constructing the original data in accordance with a predetermined hierarchical system and outputting the digital signals in the n hierarchies as first to nth digital information arranged in descending order of degrees of importance. A modulating portion digitally modulates first to nth carriers having different frequencies which are respectively assigned to the first to nth digital information by the digital information and for outputting first to nth digital modulation signals. A multiplexing portion frequency-multiplexes the first to nth digital modulation signals output from the modulating portion. An electrical-optical converting portion converts an electrical signal output from the multiplexing portion into an optical signal and sends out the optical signal onto the optical transmission channel.

As described in the foregoing, in the sixteenth aspect, the digital signal to be transmitted is converted into a digital signal, after which the digital signal is divided into digital information of a plurality of hierarchies depending on degrees of importance in constructing the original date. The carriers having different frequencies which are assigned every hierarchies are digitally modulated by the digital information, and all the digital modulation signals are frequency-multiplexed and are together optically transmitted.

According to the sixteenth aspect, therefore, transmission information can be subjected to various operations or transmission control depending on degrees of importance in constructing a transmission signal. As a result, it is possible to realize an optical transmission system which is high in quality, low in cost, and superior in the possibility of development.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (1) First Embodiment

Figure 1:
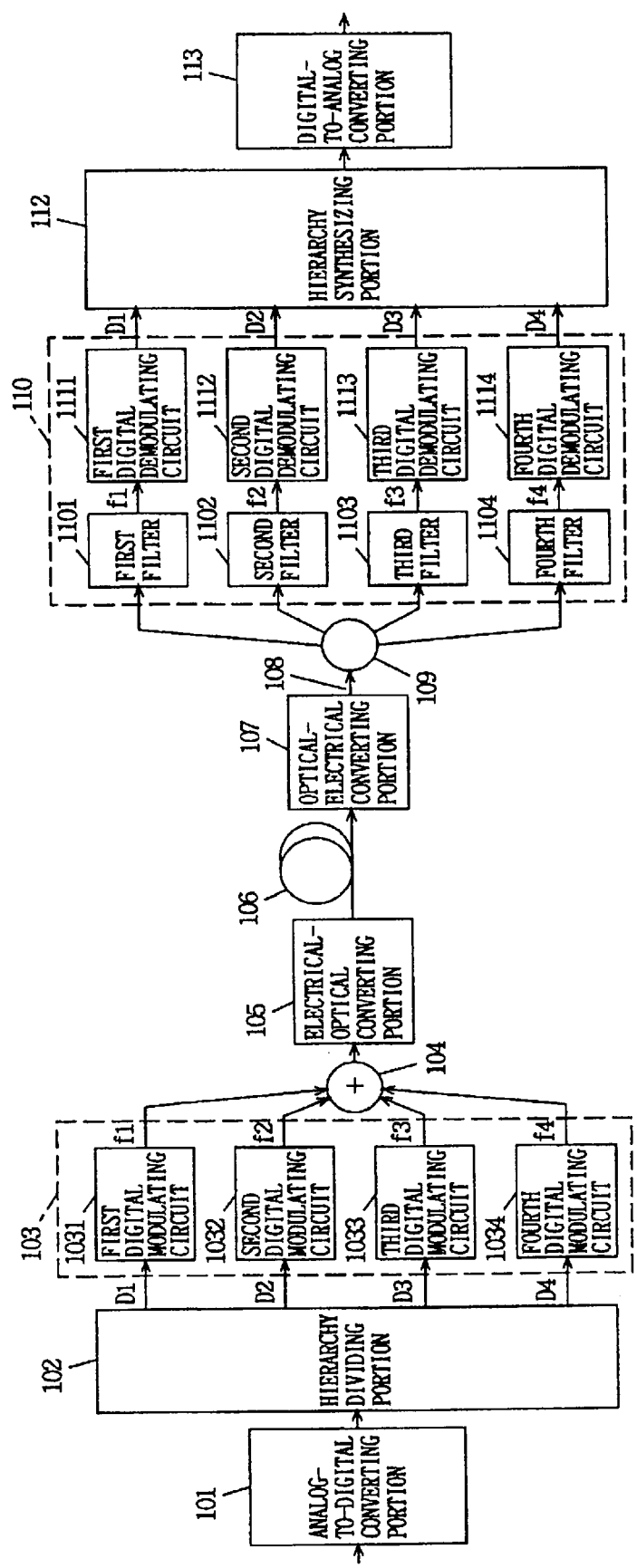
FIG. 1 is a block diagram showing the construction of an optical transmission system according to a first embodiment of the present invention.

FIG. 1 is a diagram showing the construction of an optical transmission system according to a first embodiment of the present invention. In FIG. 1, the optical transmission system includes an analog-to-digital converting portion 101, a hierarchy separating portion 102, a modulating portion 103, a multiplexing portion 104, an electrical-optical converting portion 105, an optical transmission channel 106, an optical-electrical converting portion 107, a transmission channel 108, a branching portion 109, a demodulating portion 110, a hierarchy synthesizing portion 112, and a digital-to-analog converting portion 113. The modulating portion 103 includes first to fourth digital modulating circuits 1031 to 1034, and the demodulating portion 110 includes first to fourth filters 1101 to 1104 and first to fourth digital demodulating circuits 1111 to 1114.

Figure 2:
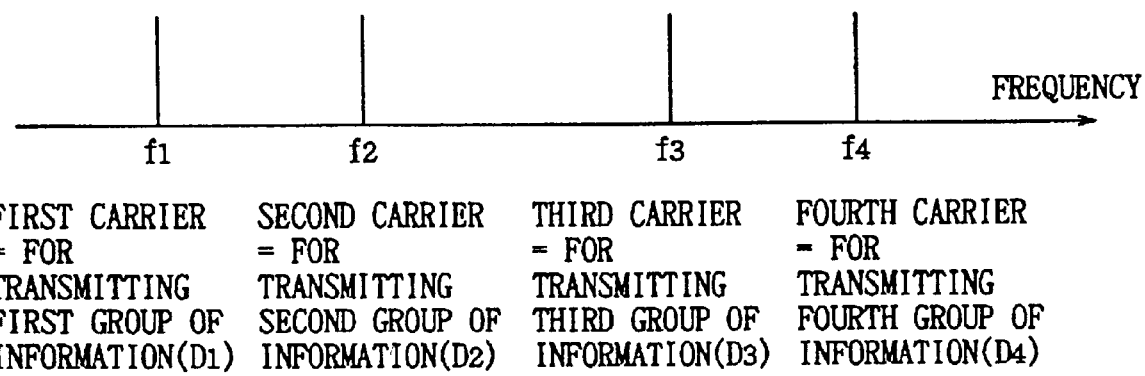
FIG. 2 is a diagram showing one example of the frequency arrangement of carriers for digital modulation in the optical transmission system according to the first embodiment of the present invention.

Description is now made of operations of the optical transmission system according to the first embodiment. The analog-to-digital converting portion 101 samples and quantizes an analog signal, such as an image signal, and converts the analog signal into a digital signal. The hierarchy separating portion 102 divides the digital signal into a plurality of groups of digital information depending on degrees of importance in constructing the original analog signal in accordance with a predetermined hierarchical system. In FIG. 1, the digital signal is divided into four groups of information, $D_1$ to $D_4$. In the modulating portion 103, the first to fourth digital modulating circuits 1031 to 1034 are respectively provided so as to correspond to the first to fourth groups of digital information $D_1$ to $D_4$. The first to fourth digital modulating circuits 1031 to 1034 respectively convert the groups of digital information into digital modulation signals using four carriers having different frequencies $f_1$, $f_2$, $f_3$ and $f_4$ and output the digital modulation signals. For example, the first digital modulating circuit 1031 uses the carrier having the frequency $f_1$, to convert the first group of digital information $D_1$ into a digital modulation signal. An example of the frequency arrangement of the first to fourth carriers is illustrated in FIG. 2. Specifically, in the present embodiment, the frequency $f_1$ of the carrier used for transmitting the first group of digital information $D_1$ having the highest degree of importance is arranged on the lowest frequency side, and the frequency $f_4$ of the carrier used for transmitting the fourth group of digital information $D_4$ having the lowest degree of importance is arranged on the highest frequency side.

The multiplexing portion 104 frequency-multiplexes all the digital modulation signals outputted from the first to fourth digital modulating circuits 1031 to 1034. A digital modulation signal obtained as a result of the frequency-multiplexing is converted into an optical signal by the electrical-optical converting portion 105. The optical signal is then transmitted through the optical transmission channel 106. The optical-electrical converting portion 107 reconverts the transmitted optical signal into an electrical signal. The electrical signal obtained as a result of the reconversion is transmitted through the transmission channel 108, and is branched into four electrical signals by the branching portion 109. After the signal is branched, the four electrical signals are respectively input into the first to fourth filters 1101 to 1104 in the demodulating portion 110. The first to fourth filters 1101 to 1104 and the first to fourth digital demodulating circuits 1111 to 1114 are provided so as to correspond to the first to fourth groups of digital information $D_1$ to $D_4$ respectively, and pass only the respective digital modulation signals and output the respective groups of digital information. For example, the first digital demodulating circuit 1111 demodulates the first group of digital information $D_1$, and outputs the demodulated information. The hierarchy synthesizing portion 112 synthesizes the first to fourth groups of digital information $D_1$ to $D_4$ to make one digital signal in accordance with a process reverse to that in the above-mentioned predetermined hierarchical system. The digital-to-analog converting portion 113 subjects an output of the hierarchy synthesizing portion 112 to digital-to-analog conversion, to reproduce an analog signal. One way to accomplish the above-mentioned predetermined hierarchical system is to divide the digital signal into groups of bits and to arrange the groups according to significance. When the number of quantized bits composing a digital signal is "8", and the quantized bits are taken as $b_1$ (LSB: Least Significant Bit), $b_2$, $b_3$, $b_4$, $b_5$, $b_6$, $b_7$, and $b_8$ (MSB: Most Significant Bit) in ascending order, the quantized bits can be grouped such that each group includes two bits as follows. The two bits $b_8$ and $b_7$ in the vicinity of the MSB are put in a first group of digital information, the two bits $b_6$ and $b_5$ are put in a second group of digital information, the two bits $b_4$ and $b_3$ are put in a third group of digital information, and the two bits $b_2$ and $b_1$ in the vicinity of the LSB are put in a fourth group of digital information. Another way to accomplish the hierarchical system is to convert the digital signal into a frequency representation using a predetermined time/frequency conversion method and dividing the frequency components of the frequency representation into four groups. The lowest frequency component, i.e., the information in the vicinity of a DC component, is put in the first group of digital information and the highest frequency component is put in the fourth group of digital information. Examples of the predetermined time/frequency conversion include Fourier transform and discrete cosine transform (DCT).

(2) Second Embodiment

Figure 3:
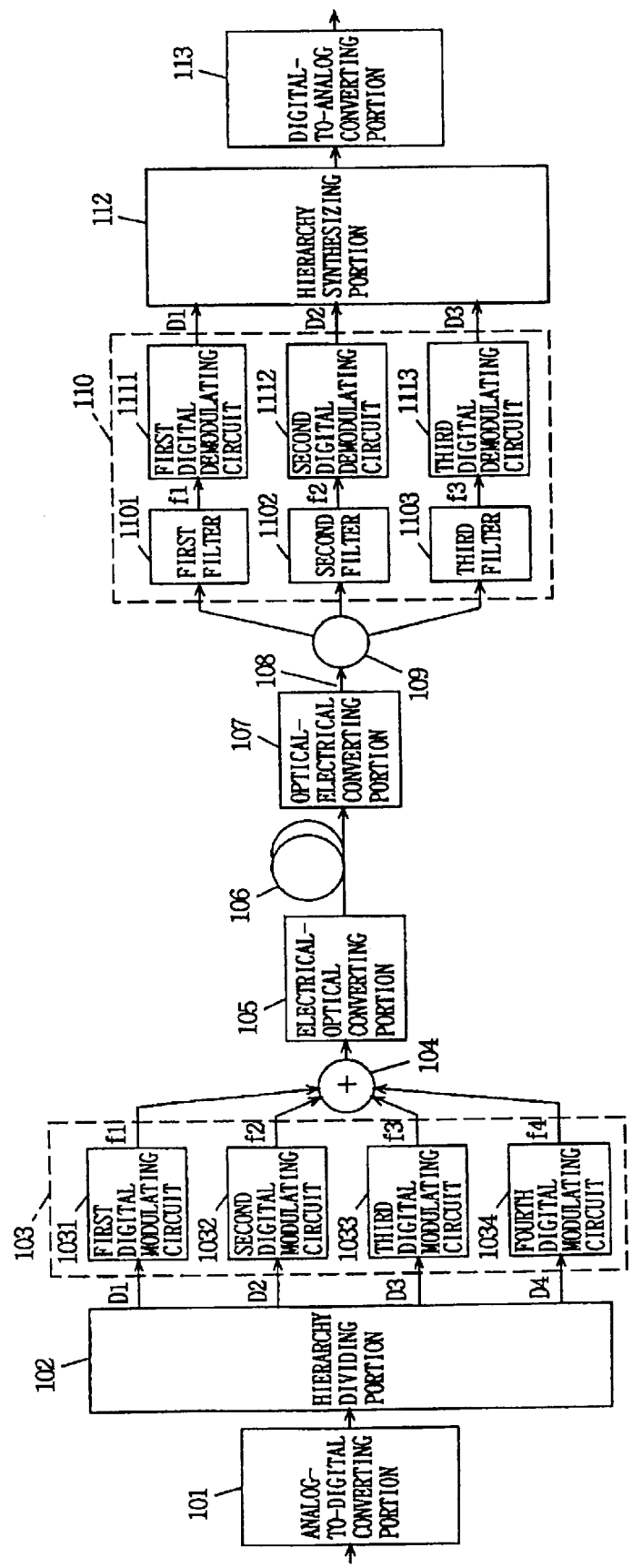
FIG. 3 is a block diagram showing the construction of an optical transmission system according to a second embodiment of the present invention.

FIG. 3 is a diagram showing the construction of an optical transmission system according to a second embodiment of the present invention. In FIG. 3, the optical transmission system includes an analog-to-digital converting portion 101, a hierarchy separating portion 102, a modulating portion 103, a multiplexing portion 104, an electrical-optical converting portion 105, an optical transmission channel 106, an optical-electrical converting portion 107, a transmission channel 108, a branching portion 109, a demodulating portion 110, a hierarchy synthesizing portion 112, and a digital-to-analog converting portion 113. The modulating portion 103 includes first to fourth digital modulating circuits 1031 to 1034. Further, the demodulating portion 110 includes first to third filters 1101 to 1103 and first to third digital demodulating circuits 1111 to 1113.

Description is now made of operations of the optical transmission system according to the second embodiment. Detailed operations of respective components are the same as those in the first embodiment and therefore, only the operations characteristic to the second embodiment will be described. The present embodiment illustrates a system in which a receiver need not receive a high-quality signal or a system in which the receiver cannot receive the high-quality signal. Specifically, the branching portion 109 branches a signal outputted from the transmission channel 108 into three signals, and respectively inputs the signals to the first to third filters 1101 to 1103 in the demodulating portion 110. The first to third filters 1101 to 1103 and the first to third digital demodulating circuits 1111 to 1113 are provided so as to correspond to first to third groups of digital information $D_1$ to $D_3$, respectively and demodulate and convert the respective digital modulation signals to the digital information and output the digital information. Consequently, on the receiving side, the fourth group of digital information $D_4$ is not reproduced. The hierarchy synthesizing portion 112 synthesizes only the first to third groups of digital information $D_1$ to $D_3$ to make a digital signal without using the fourth group of digital information $D_{41}$, and outputs the digital signal. A receiver might not receive the high-quality signal when, for example, the transmittable bandwidth of the transmission channel 108 is narrow, thus preventing the digital modulation signal of the fourth group of digital information $D_4$ from being transmitted.

(3) Third Embodiment

Figure 4:
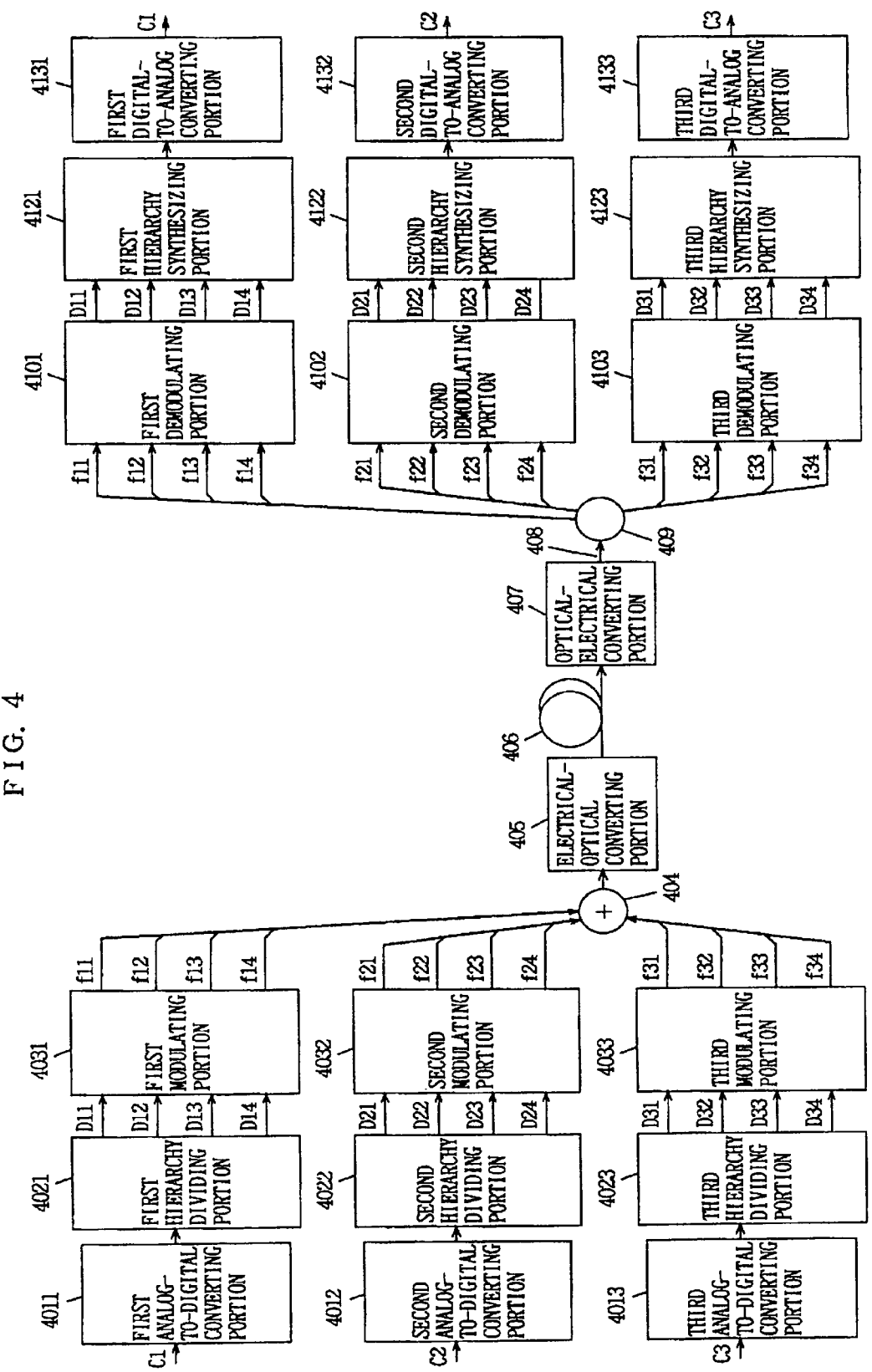
FIG. 4 is a block diagram showing the construction of an optical transmission system according to a third embodiment of the present invention.

FIG. 4 is a diagram showing the construction of an optical transmission system according to a third embodiment of the present invention. In FIG. 4, the optical transmission system includes first to third analog-to-digital converting portions 4011 to 4013, first to third hierarchy separating portions 4021 to 4023, first to third modulating portions 4031 to 4033, a channel multiplexing portion 404, an electrical-optical converting portion 405, an optical transmission channel 406, an optical-electrical converting portion 407, a transmission channel 408, a channel branching portion 409, first to third demodulating portions 4101 to 4103, first to third hierarchy synthesizing portions 4121 to 4123, and first to third digital-to-analog converting portions 4131 to 4133. Each of the modulating portions includes four digital modulating circuits, and each of the demodulating portions includes four sets of filters and digital demodulating circuits.

Description is now made of operations of the optical transmission system according to the third embodiment. The present embodiment illustrates a system in which the above-mentioned first embodiment is enlarged to accomplish transmission on multi-channels (three channels in FIG. 4: $C_1$, $C_2$, and $C_3$). For example, the signal on the first channel $C_1$ is converted into a digital signal by the first analog-to-digital converting portion 4011, after which the digital signal is divided into four groups of digital information $D_{11}$ to $D_{14}$ which differ in degrees of importance by the first hierarchy separating portion 4021, and the four groups of digital information are respectively converted into digital modulation signals using four carriers having different frequencies $f_{11}$ to $f_{14}$ in the first modulating portion 4031.

Figure 5:
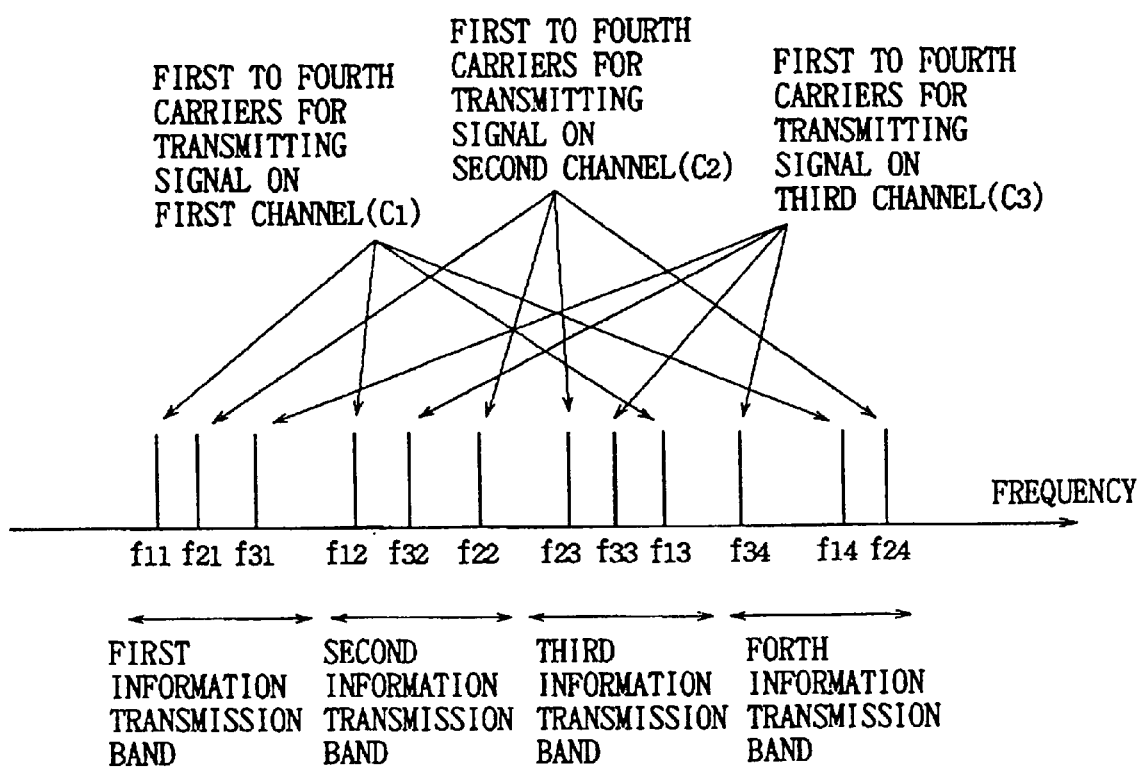
FIG. 5 is a diagram showing one example of the frequency arrangement of carriers for digital modulation in the optical transmission system according to the third embodiment of the present invention.

FIG. 5 illustrates one example of the frequency arrangement of the four carriers which are assigned to each of the signals on the first to third channels. As shown in FIG. 5, out of the first to fourth carriers corresponding to the signal on each of the channels, the carrier used for the transmission of the digital information having a higher degree of importance is arranged on a lower frequency side of the frequency spectrum, and the carrier used for the transmission of digital information having a lower degree of importance is arranged on a higher frequency side of the frequency spectrum. Further, the entire transmission band is divided into first to fourth information transmission bands from a low frequency band to a high frequency band. All the first carriers, all the second carriers, all the third carriers, and all the fourth carriers corresponding to the signals on all the channels are arranged in the first information transmission band, the second information transmission band, the third information transmission band, and the fourth information transmission band respectively. Although in the present embodiment, the entire transmission band is divided into the four information transmission bands so that a signal in any one of hierarchies on all the channels is included in each of the information transmission bands, the degrees of importance of all information of the hierarchies on all the channels are assigned by a same standard so that the carriers are arranged on the frequency axis in accordance with the priorities without providing such information transmission bands.

The channel multiplexing portion 404 frequency-multiplexes all the digital modulation signals outputted from all the modulating portions 4031 to 4033. A signal obtained as a result of the frequency-multiplexing is transmitted through the electrical-optical converting portion 405 to the transmission channel 408, and is then branched into three signals in the channel branching portion 409. The signals are then input into the first to third demodulating portions 4101 to 4103 respectively. The first to third demodulating portions are provided so as to correspond to the signals on the respective channels. For example, in the first demodulating portion 4101, only four digital modulation signals having frequencies $f_{11}$, $f_{12}$, $f_{13}$ and $f_{14}$ corresponding to the signal on the first channel $C_1$ are passed, demodulated, and outputted as four groups of digital information $D_{11}$, $D_{12}$, $D_{13}$ and $D_{14}$. The four groups of digital information are synthesized to make one digital signal by the first hierarchy synthesizing portion 4121. The digital signal is reconverted into an analog signal by the first digital-to-analog converting portion 4131, and the analog signal is outputted.

(4) Fourth Embodiment

Figure 6:
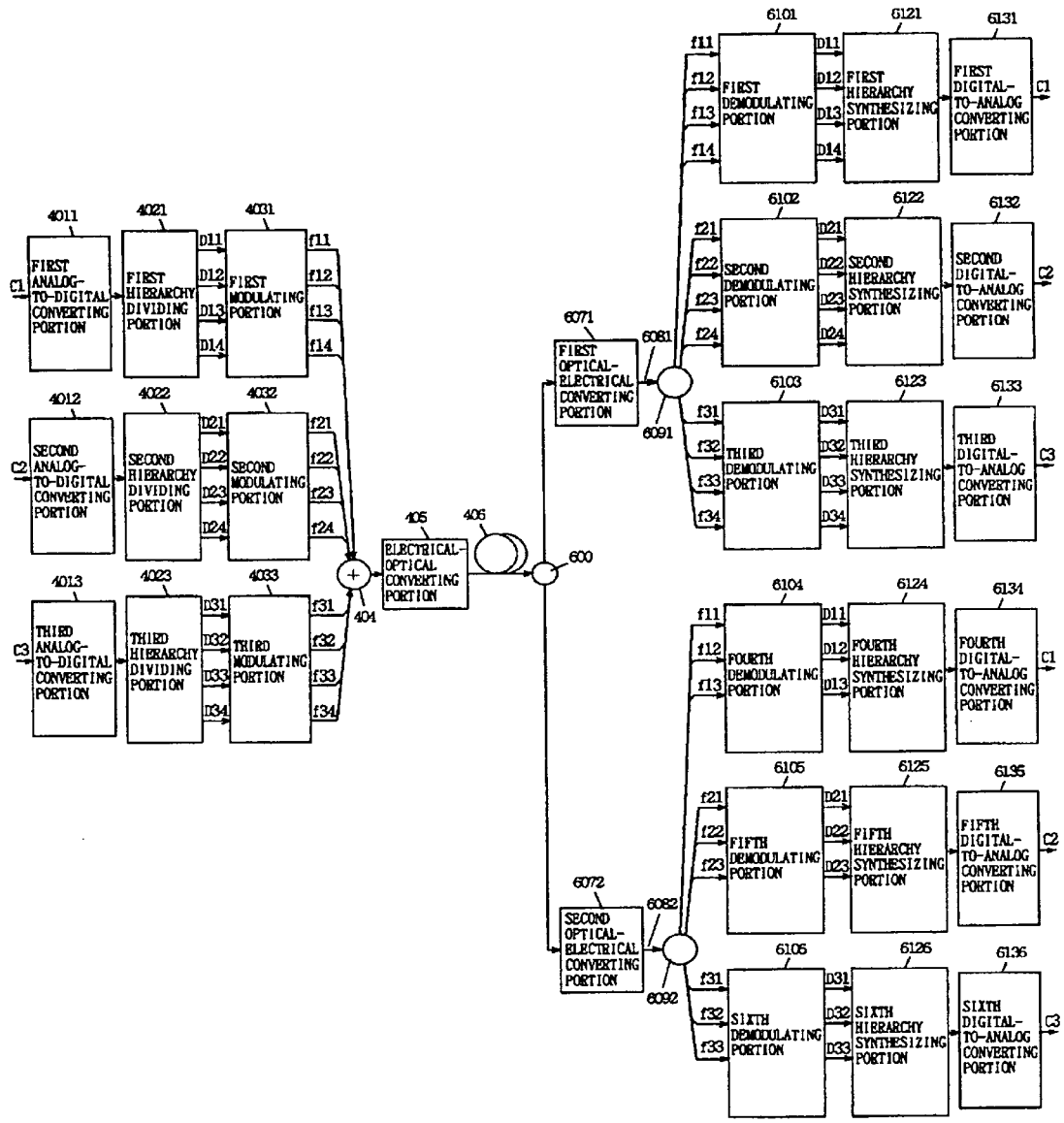
FIGS. 6A and 6B illustrate a block diagram showing the construction of an optical transmission system according to a fourth embodiment of the present invention.

FIGS. 6A and 6B illustrate a diagram showing the construction of an optical transmission system according to a fourth embodiment of the present invention. In FIGS. 6A and 6B, the optical transmission system includes first to third analog-to-digital converting portions 4011 to 4013, first to third hierarchy separating portions 4021 to 4023, first to third modulating portions 4031 to 4033, a channel multiplexing portion 404, an electrical-optical converting portion 405, an optical transmission channel 406, a light distributing portion 600, first and second optical-electrical converting portions 6071 to 6072, first and second transmission channels 6081 and 6082, first and second channel branching portions 6091 and 6092, first to sixth demodulating portions 6101 to 6106, first to sixth hierarchy synthesizing portions 6121 to 6126, and first to sixth digital-to-analog converting portions 6131 to 6136. As in the above-mentioned first to third embodiments, each of the modulating portions includes four digital modulating circuits, and each of the demodulating portions includes four sets of filters and digital demodulating circuits.

Description is now made of operations of the optical transmission system according to the fourth embodiment. The present embodiment illustrates construction in which the third embodiment is adapted to a case where the number of receivers (or optical-electrical converting portions) is plural (two in FIGS. 6A and 6B). Each of the signals on first to third channels $C_1$ to $C_3$ is divided into groups of digital information of four hierarchies, after which the groups of digital information are converted into respective digital modulation signals, and the digital modulation signals are frequency-multiplexed. A signal obtained as a result of the frequency-multiplexing is converted into an optical signal, and the optical signal is transmitted through the optical transmission channel 406. The optical signal is branched into two optical signals by the optical branching portion 600, after which the optical signals are input into the first and second optical-electrical converting portions 6071 and 6072 respectively. For example, the first optical-electrical converting portion 6071 reconverts the received optical signal into an electrical signal. The electrical signal obtained as a result of the reconversion is transmitted through the first transmission channel 6081, and is then branched into three electrical signals by the first channel branching portion 6091. The three electrical signals are respectively input into the three demodulating portions of a first receiver, i.e., the first to third demodulating portions 6101 to 6103. For example, four groups of digital information $D_{11}$, $D_{12}$, $D_{13}$ and $D_{14}$ corresponding to the signal on the first channel $C_1$, which is demodulated in the first demodulating portion 6101, are synthesized to make one digital signal by the first hierarchy synthesizing portion 6121, and the digital signal is reconverted into an analog signal by the first digital-to-analog converting portion 6131.

Figure 7:
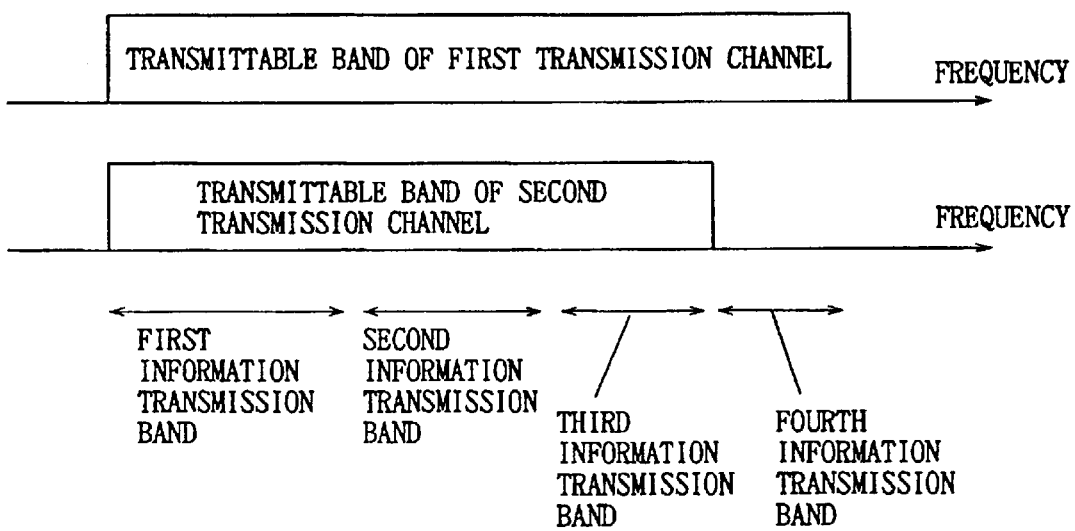
FIG. 7 is a diagram showing one example of the transmission band arrangement which can be used in the optical transmission system according to the fourth embodiment of the present invention.

Each of the demodulating portions, each of the hierarchy synthesizing portions, and each of the digital-to-analog converting portions of a second receiver carry out demodulation, synthesis and digital-to-analog conversion depending on the signal quality required by the second receiver or the transmittable bandwidth or the like, as in the second embodiment. For example, as shown in FIG. 7, when the transmittable bandwidth of the second transmission channel 6082 is narrow, only the first to third groups of digital information corresponding to each of the signals on the channels (signals transmitted by first to third carriers which are arranged in the first to third information transmission bands) are demodulated to reproduce an analog signal on the receiving side.

(5) Fifth Embodiment

Figure 8:
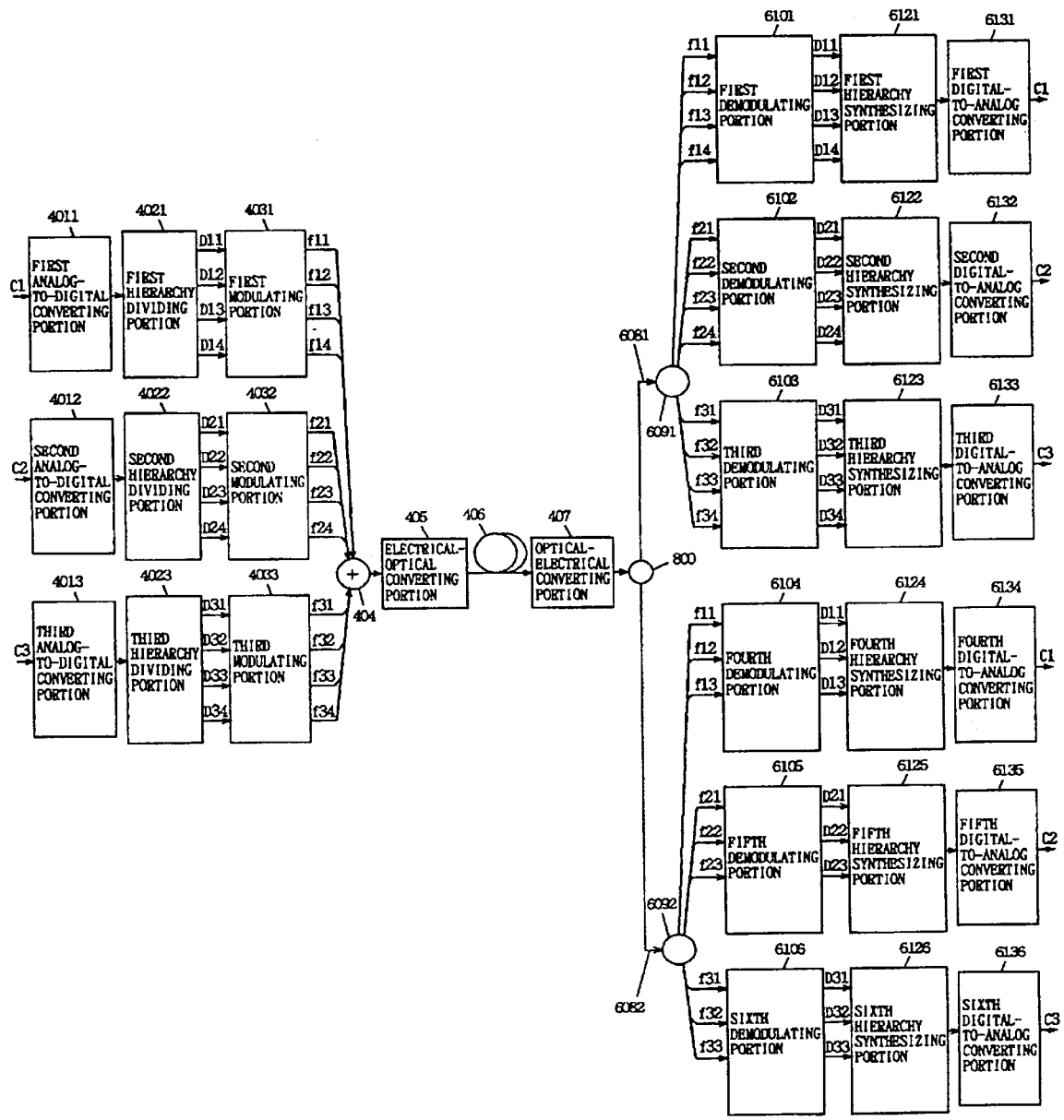
FIGS. 8A and 8B illustrate a block diagram showing the construction of an optical transmission system according to a fifth embodiment of the present invention.
Figure 9:
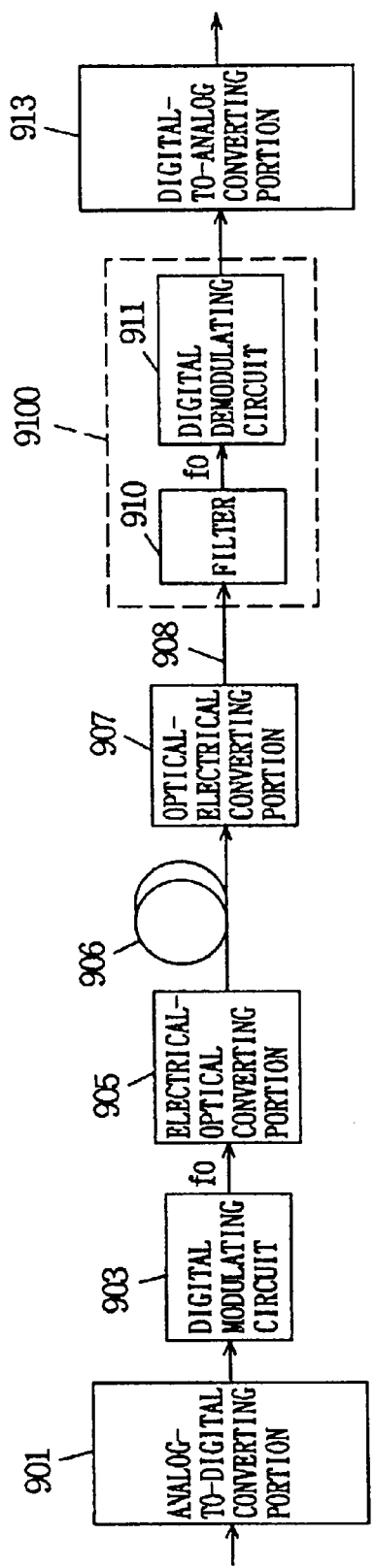
FIG. 9 is a block diagram showing a first example of a conventional optical transmission system.
Figure 10:
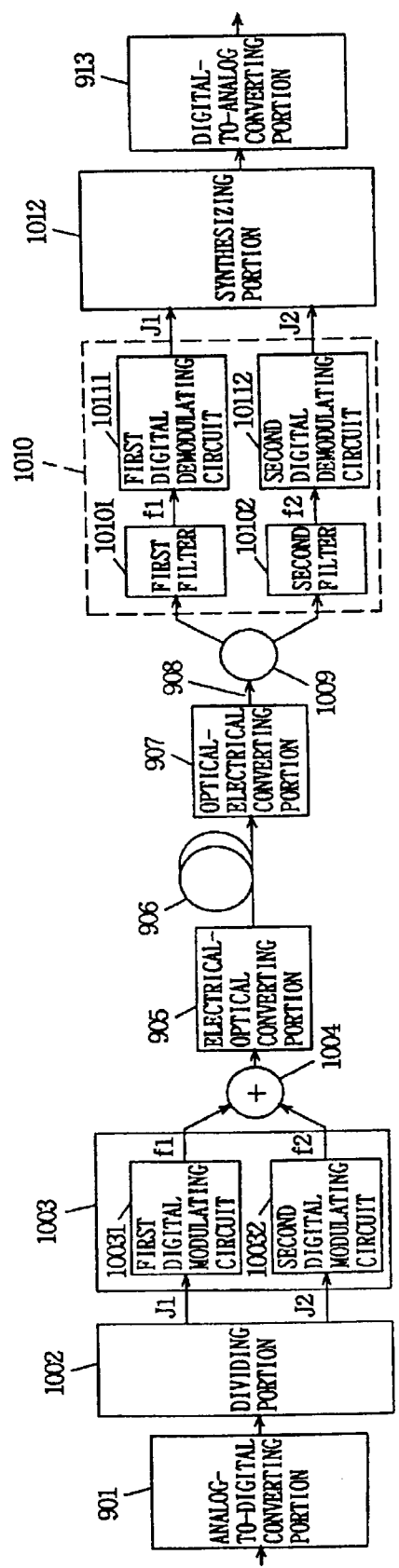
FIG. 10 is a block diagram showing a second example of the conventional optical transmission system.
Figure 11:
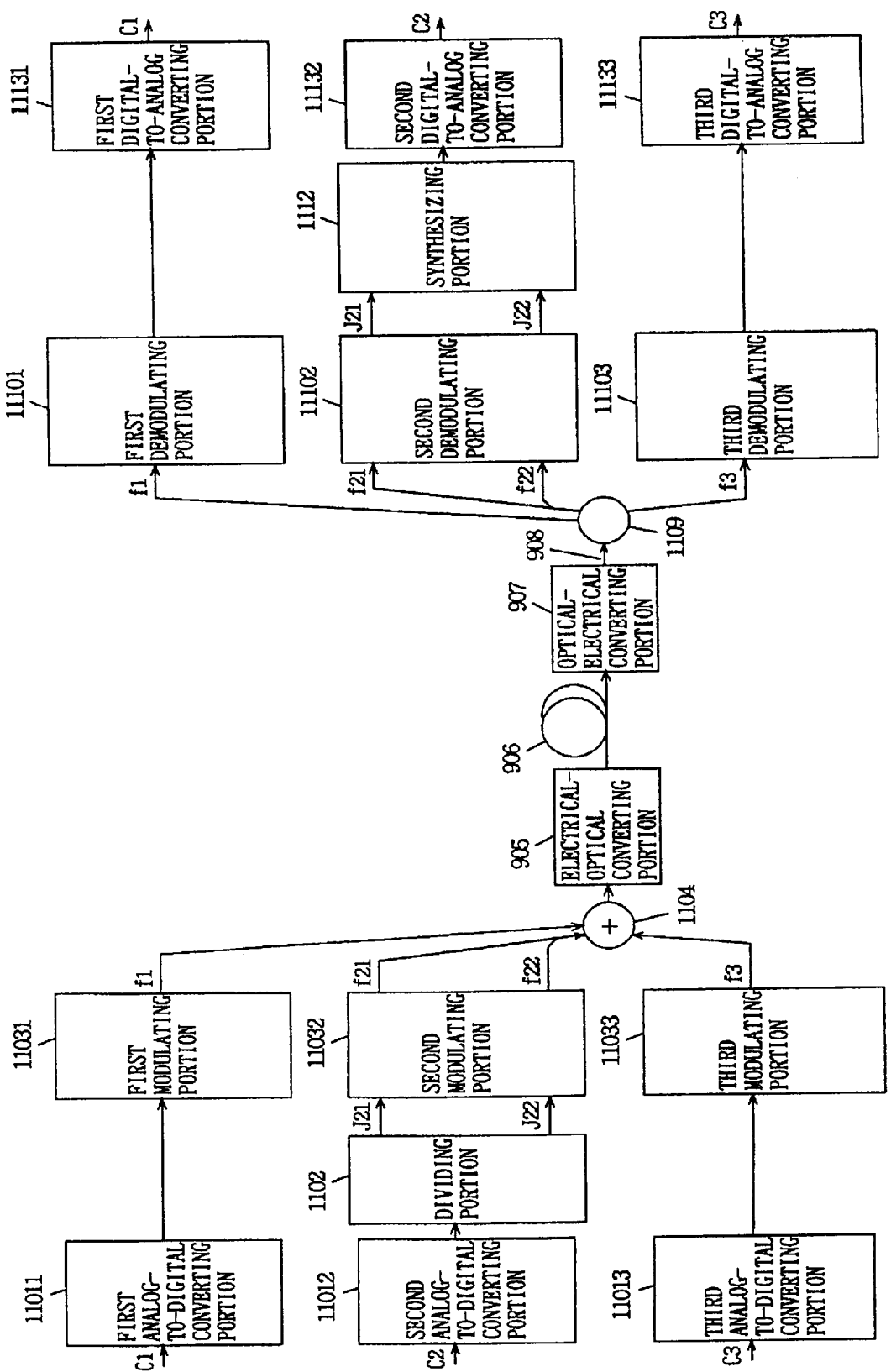
FIG. 11 is a block diagram showing a third example of the conventional optical transmission system.
Figure 12:
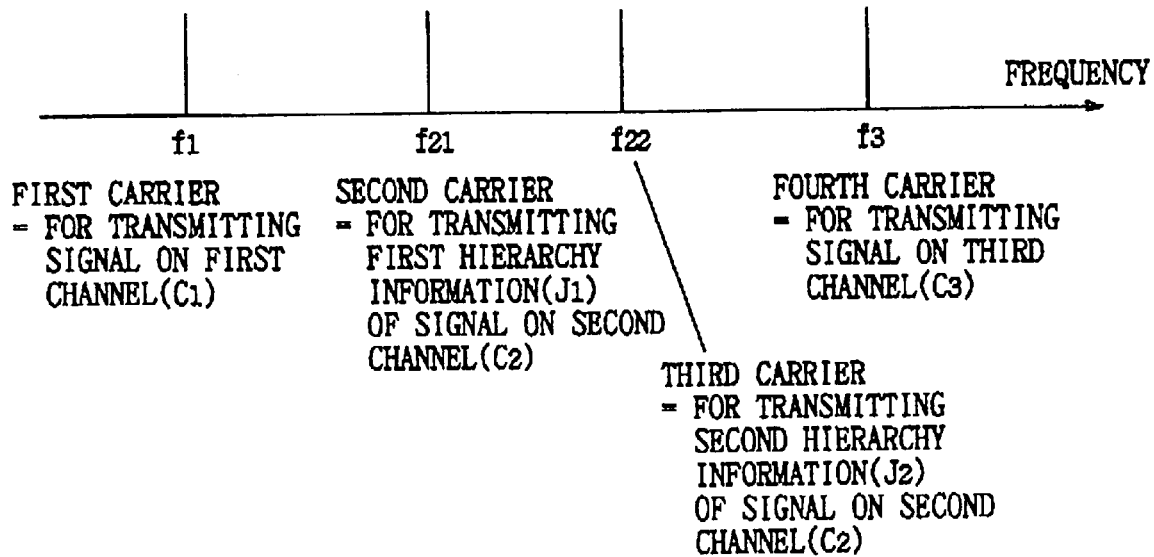
FIG. 12 is a diagram showing one example of the frequency arrangement of carriers for digital modulation in the third example of the conventional optical transmission system.

FIGS. 8A and 8B illustrate a diagram showing the construction of an optical transmission system according to a fifth embodiment of the present invention. In FIGS. 8A and 8B, the optical transmission system includes first to third analog-to-digital converting portions 4011 to 4013, first to third hierarchy separating portions 4021 to 4023, first to third modulating portions 4031 to 4033, a channel multiplexing portion 404, an electrical-optical converting portion 405, an optical transmission channel 406, an optical-electrical converting portion 407, an electrical distributing portion 800, first and second transmission channels 6081 and 6082, first and second channel branching portions 6091 and 6092, first to sixth demodulating portions 6101 to 6106, first to sixth hierarchy synthesizing portions 6121 to 6126, and first to sixth digital-to-analog converting portions 6131 to 6136. As in the above-mentioned first to fourth embodiments, each of the modulating portions includes four digital modulating circuits, and each of the demodulating portions includes four sets of filters and digital demodulating circuits.

Description is now made of operations of the optical transmission system according to the fifth embodiment. The present embodiment illustrates a construction in which the third embodiment is adapted to a case where the number of receivers is two, similarly to the above-mentioned fourth embodiment. In the fifth embodiment however, a signal is branched into two signals at an electrical signal level, unlike the fourth embodiment in which a signal is branched into two signals in the state of an optical signal. Specifically, each of the signals on the first to third channels $C_1$ to $C_3$ is divided into groups of digital information of four hierarchies, after which the groups of digital information are converted into respective digital modulation signals, and the digital modulation signals are frequency-multiplexed. A signal obtained as a result of the frequency-multiplexing is converted into an optical signal, and the optical signal is transmitted through the optical transmission channel 406, after which the optical signal is reconverted into an electrical signal by the optical-electrical converting portion 407. The electrical signal is branched into two electrical signals by the electrical distributing portion 800, and the electrical signals are input into the channel branching portions of the first and second channel branching portions 6091 and 6092 respectively. The channel branching portion, the demodulating portion, the hierarchy synthesizing portion, and the digital-to-analog converting portion reproduce each of analog signals on the three channels $C_1$, $C_2$ and $C_3$, as in the fourth embodiment. Also, as in the present embodiment, the amount of information to be transmitted is restricted by the transmittable bandwidth of the second transmission channel 6082. On the side of the second receiver, each of the analog signals is reproduced from only the first to third digital information transmitted by first to third information transmission bands.

Although in the above-mentioned embodiments, an analog signal is converted into a digital signal, after which the digital signal is hierarchically divided, multiplexed and optically transmitted, the present invention is also applicable when digital data is hierarchically divided, multiplexed and optically transmitted. Such a case, the analog-to-digital converting portion 101 and the digital-to-analog converting portion 113 are not required.

Further, in multi-channels transmission, digital signals on all channels may not be divided into the same numbers of hierarchies as those of channels. For example, in four channel transmission, the digital signals of three of the channels may be divided into four hierarchies respectively and transmitted, and the digital signal of the remaining channel may be divided into three hierarchies and transmitted.

As described in the prior art, generally in an optical transmission system, the waveform of a digital modulation signal having a high carrier frequency is greatly degraded. In each of the above-mentioned embodiments, therefore, a lower frequency band is used as a band where digital information having a higher degree of importance is to be transmitted, and a higher frequency band is used as a band where digital information having a lower degree of importance is to be transmitted. When degradation of the waveform caused by a particular order distortion is taken up as a problem on the multi-channel transmission, however, a frequency band whose transmission characteristics are not good does not necessarily exist in a higher frequency, whereby the other frequency bands may be used to transmit the digital information having a lower degree of importance in some cases. For example, third order distortion is increased in an intermediate band in the entire transmission band. When degradation of the waveform caused by the third order distortion is taken up a problem, therefore, the digital information having a low degree of importance is transmitted using the intermediate band. On the other hand, second order distortion is increased in the high band and the low band in the entire transmission band. When degradation of the waveform caused by the second order distortion is a problem, the digital information having a low degree of importance is transmitted using the high band or the low band.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for transmitting information on a transmission medium, said method comprising:

arranging the information into a plurality of groups of information including a highest group and a lowest group, according to a hierarchy of importance, such that said highest group contains a portion of the information of a highest importance and said lowest group contains a portion of the information of a lowest importance; and transmitting said plurality of groups through the transmission medium such that said highest group is transmitted at a first frequency, at which a transmission characteristic of the transmission medium is of high quality, and said lowest-group is transmitted at a second frequency, at which the transmission characteristic of the transmission medium is of lower quality than at said first frequency.

2. A method for transmitting information as claimed in claim 1, wherein the information includes a plurality of bits ranging from a most significant bit to a least significant bit, the portion of the information of the highest importance includes the most significant bit, and the portion of the information of the lowest importance includes the least significant bit.

3. A method for transmitting information as claimed in claim 1, wherein the information includes a plurality of frequency components ranging from a lowest frequency component to a highest frequency component, the portion of the information of the highest importance includes the lowest frequency component, and the portion of the information of the lowest importance includes the highest frequency component.

4. A method for transmitting information as claimed in claim 1, further comprising:

receiving from the transmission medium at least said highest group of information.

5. A method of transmitting information as claimed in claim 4, further comprising receiving all of said plurality of groups of information except said lowest group.

6. A method of transmitting information as claimed in claim 4, further comprising reconstructing the information from said at least said highest group of information received from the transmission medium.

7. An optical transmission system comprising:

a hierarchy separating portion for receiving a digital signal which represents information, and for dividing the digital signal into n digital portion signals each of which includes a respective one of a plurality of portions of the digital signal, according to a hierarchy, such that a first to an nth digital portion signals are arranged according to decreasing degrees of importance of the respective portion, from a highest degree to an nth degree, wherein n is a number greater than or equal to two;

a modulating portion for receiving said n digital portion signals, and for digitally modulating n carriers with said n digital portion signals respectively to form n digital modulation signals respectively, said n carriers each having different frequencies;

a multiplexing portion for receiving said n digital modulation signals, and for frequency multiplexing said n digital modulation signals to form a first electrical signal;

an electrical-optical converting portion for receiving said first electrical signal, and for converting said first electrical signal into a corresponding optical signal;

an optical transmission channel for conveying said corresponding optical signal;

an optical-electrical converting portion for receiving said corresponding optical signal from said optical transmission channel, and for reconverting said corresponding optical signal into a second electrical signal;

a transmission channel for conveying said second electrical signal;

a branching portion for receiving said second electrical signal from said transmission channel, and for branching said second electrical signal into m branched electrical signals, wherein m is a number greater than or equal to one and less than or equal to n;

a demodulating portion for receiving said m branched electrical signals, and for demodulating said m branched electrical signals to form m digital portion signals; and a hierarchy synthesizing portion for receiving said m digital portion signals, and for combining said m digital portion signals, such that a first to art mth digital portion signals are arranged according to said decreasing degrees of importance from said highest degree to an mth degree according to said hierarchy, to form a synthesized digital signal which represents the information.

8. An optical transmission system as claimed in claim 7, further comprising:

an analog-to-digital converting portion for receiving an analog information signal, convverting the analog information signal into a digital information signal and for inputting the digital information signal into said hierarchy separating portion; and a digital-to-analog converting portion for receiving said synthesized digital signal from said hierarchy synthesizing portion and for converting said synthesized digital signal into a synthesized analog signal.

9. The optical transmission system of claim 7, wherein, in an entire transmission band of said electrical-optical converting portion, said optical transmission channel, said optical-electrical converting portion, and said transmission channel, a first of said n carriers, which carries a portion of the digital signal of a highest degree of importance, is arranged in a band, within the entire transmission band, having a transmission characteristic which is of high quality, and an nth of said n carriers, which carries a portion of the digital signal of a lowest degree of importance, is arranged in a band, within the entire transmission band, having a transmission characteristic which is of lower quality.

10. An optical transmission system comprising:

a hierarchy separating portion for receiving a digital signal having w bits, and for dividing the digital signal into n digital portion signals each of which includes a respective one or more of said w bits, according to a hierarchy, such that a first to an nth digital portion signals are arranged according to decreasing degrees of significance of the respective one or more of said w bits, from a highest degree to an nth degree, wherein n is a number greater than or equal to two and w is a number greater than or equal to n;

a modulating portion for receiving said n digital portion signals, and for digitally modulating n carriers with said n digital portion signals respectively, to form n digital modulation signals respectively, said n carriers each having different frequencies;

a multiplexing portion for receiving said n digital modulation signals, and for frequency multiplexing said n digital modulation signals to form a first electrical signal;

an electrical-optical converting portion for receiving said first electrical signal, and for converting said first electrical signal into a corresponding optical signal;

an optical transmission channel for conveying said corresponding optical signal;

an optical-electrical converting portion for receiving said corresponding optical signal from said optical transmission channel, and for reconverting said corresponding optical signal into a second electrical signal;

a transmission channel for conveying said second electrical signal;

a branching portion for receiving said second electrical signal from said transmission channel, and for branching said second electrical signal into m branched electrical signals, wherein m is a number greater than or equal to one and less than or equal to n;

a demodulating portion for receiving said m branched electrical signals, and for demodulating said m branched electrical signals to form m digital portion signals; and a hierarchy synthesizing portion for receiving said m digital portion signals, and for combining said m digital portion signals, such that a first to an mth digital portion signals are arranged according to said decreasing degrees of significance from said highest degree to an mth degree according to said hierarchy, to form a synthesized digital signal which represents the information;

wherein, in an entire transmission band of said electrical-optical converting portion, said optical transmission channel, said optical-electrical converting portion, and said transmission channel, a first of said n carriers, which carries a most significant bit of the digital signal, is arranged in a band, within the entire transmission band, having a transmission characteristic which is of high quality, and an nth of said n carriers, which carries a least significant bit of the digital signal, is arranged in a band, within the entire transmission band, having a transmission characteristic which is of lower quality.

11. An optical transmission system comprising:

a hierarchy separating portion for receiving a digital signal which represents information, time/frequency converting said digital signal into a frequency digital signal, and for dividing the frequency digital signal into n digital portion signals each of which includes a respective one of a plurality of frequency components of the frequency digital signal, according to a hierarchy, such that a first to an nth digital portion signals are arranged according to decreasing degrees of importance of the respective frequency component, from a highest degree to an nth degree, wherein n is a number greater than or equal to two;

a modulating portion for receiving said n digital portion signals, and for digitally modulating n carriers with said n digital portion signals respectively, to form n digital modulation signals respectively, said n carriers each having different frequencies;

a multiplexing portion for receiving said n digital modulation signals, and for frequency multiplexing said n digital modulation signals to form a first electrical signal;

an electrical-optical converting portion for receiving said first electrical signal, and for converting said first electrical signal into a corresponding optical signal;

an optical transmission channel for conveying said corresponding optical signal;

an optical-electrical converting portion for receiving said corresponding optical signal from said optical transmission channel, and for reconverting said corresponding optical signal into a second electrical signal;

a transmission channel for conveying said second electrical signal;

a branching portion for receiving said second electrical signal from said transmission channel, and for branching said second electrical signal into m branched electrical signals, wherein m is a number greater than or equal to one and less than or equal to n;

a demodulating portion for receiving said m branched electrical signals, and for demodulating said m branched electrical signals to form m digital portion signals; and a hierarchy synthesizing portion for receiving said m digital portion signals, and for combining said m digital portion signals, such that a first to an mth digital portion signals are arranged according to said decreasing degrees of importance from said highest degree to an mth degree according to said hierarchy, to form a synthesized digital signal which represents the information;

wherein, in an entire transmission band of said electrical-optical converting portion, said optical transmission channel, said optical-electrical converting portion, and said transmission channel, a first of said n carriers, which carries a lowest frequency component of the frequency digital signal, is arranged in a band, within the entire transmission band, having a transmission characteristic which is of high quality, and an nth of said n carriers, which carries a highest frequency component of the frequency digital signal, is arranged in a band, within the entire transmission band, having a transmission characteristic which is of lower quality.

12. An optical transmission system as claimed in claim 11, wherein said hierarchy separating portion time/frequency converts the digital signal by subjecting the digital signal to a Fourier transform.

13. An optical transmission system as claimed in claim 11, wherein said hierarchy separating portion time/frequency converts the digital signal by subjecting the digital signal to a discrete cosine transform.

14. An optical transmission system comprising:

a hierarchy separating portion for receiving a digital signal which represents information, and for dividing the digital signal into n digital portion signals each of which includes a respective one of a plurality of portions of the digital signal, according to a hierarchy, such that a first to an nth digital portion signals are arranged according to decreasing degrees of importance of the respective portion, from a highest degree to an nth degree, wherein n is a number greater than or equal to two;

a modulating portion for receiving said n digital portion signals, and for digitally modulating n carriers with said n digital portion signals respectively, to form n digital modulation signals respectively, said n carriers each having different frequencies;

a multiplexing portion for receiving said n digital modulation signals, and for frequency multiplexing said n digital modulation signals to form a first electrical signal;

an electrical-optical converting portion for receiving said first electrical signal, and for converting said first electrical signal into a corresponding optical signal;

an optical transmission channel for conveying said corresponding optical signal;

an optical-electrical converting portion for receiving said corresponding optical signal from said optical transmission channel, and for reconverting said corresponding optical signal into a second electrical signal;

a transmission channel for conveying said second electrical signal;

a branching portion for receiving said second electrical signal from said transmission channel, and for branching said second electrical signal into m branched electrical signals, wherein m is a number greater than or equal to one and less than or equal to n;

a demodulating portion for receiving said m branched electrical signals, and for demodulating said m branched electrical signals to form m digital portion signals; and a hierarchy synthesizing portion for receiving said m digital portion signals, and for combining said m digital portion signals, such that a first to an mth digital portion signals are arranged according to said decreasing degrees of importance from said highest degree to an mth degree according to said hierarchy, to form a synthesized digital signal which represents the information;

wherein, in an entire transmission band of said electrical-optical converting portion, said optical transmission channel, said optical-electrical converting portion, and said transmission channel, a first of said n carriers, which carries a portion of the digital signal of a highest degree of importance, is arranged in a higher frequency band, within the entire transmission band, and an nth of said n carriers, which carries a portion of the digital signal of a lowest degree of importance, is arranged in a lower frequency band, within the entire transmission band.

15. An optical transmission system comprising:

p transmission sets for transmitting on p channels, each of said p transmission sets including, a hierarchy separating portion, in said each of said p transmission sets, for receiving a digital signal from a corresponding one of said p channels, wherein the digital signal represents information, and for dividing the digital signal into n digital portion signals each of which includes a respective one of a plurality of portions of the digital signal, according to a hierarchy, such that a first to an nth digital portion signals are arranged according to decreasing degrees of importance of the respective portion, from a highest degree to an nth degree, wherein n is a number greater than or equal to two, and a modulating portion, in said each of said p transmission sets, for receiving said n digital portion signals, and for digitally modulating n carriers with said n digital portion signals respectively, to form n digital modulation signals respectively, said n carriers each having different frequencies;

a multiplexing portion for receiving said n digital modulation signals from each of said p transmission sets, and for frequency multiplexing said n digital modulation signals from each of said p transmission sets to form a first electrical signal;

an electrical-optical converting portion for receiving said first electrical signal, and for converting said first electrical signal into a first optical signal;

an optical transmission channel for conveying said first optical signal;

an optical-electrical converting portion for receiving said first optical signal from said optical transmission channel, and for reconverting said first optical signal into a second electrical signal;

a transmission channel for conveying said second electrical signal;

a branching portion for receiving said second electrical signal from said transmission channel, and for branching said second electrical signal into m branched electrical signals, wherein m is a number greater than or equal to one and less than or equal to n; and p electrical receiving sets, each of said p electrical receiving sets including,
  a demodulating portion, in said each of said p electrical receiving sets, for receiving said m branched electrical signals, and for demodulating, using carriers of a corresponding one of said p transmission sets, said m branched electrical signals to form m digital portion signals, and
  a hierarchy synthesizing portion, in said each of said p electrical receiving sets, for receiving said m digital portion signals, and for combining said m digital portion signals, such that a first to an mth digital portion signals are arranged according to said decreasing degrees of importance from said highest degree to an mth degree according to said hierarchy, to form a synthesized digital signal which represents the information of the digital signal from the corresponding one of said p channels.

16. An optical transmission system as claimed in claim 15, further comprising an entire transmission band, divided into first to nth information transmission bands which range from a low frequency band to a high frequency band respectively, wherein said first to nth information transmission bands include respective first to nth carriers from each of said p transmission sets.

17. An optical transmission system comprising:

p transmission sets for transmitting on p channels, each of said p transmission sets including,
  a hierarchy separating portion, in said each of said p transmission sets, for receiving a digital signal from a corresponding one of said p channels, wherein the digital signal represents information, and for dividing the digital signal into n digital portion signals each of which represents a respective one of a plurality of portions of the digital signal, according to a hierarchy, such that a first to an nth digital portion signals are arranged according to decreasing degrees of importance of the respective portion, from a highest degree to an nth degree, wherein n is a number greater than or equal to two, and
  a modulating portion, in said each of said p transmission sets, for receiving said n digital portion signals, and for digitally modulating n carriers with said n digital portion signals respectively, to form n digital modulation signals respectively, said n carriers each having different frequencies;

a multiplexing portion for receiving said n digital modulation signals from each of said p transmission sets, and for frequency multiplexing said n digital modulation signals from each of said p transmission sets to form a first electrical signal;

an electrical-optical converting portion for receiving said first electrical signal, and for converting said first electrical signal into a corresponding optical signal;

an optical transmission channel for conveying said corresponding optical signal;

an optical branching portion arranged on said optical transmission channel for branching said corresponding optical signal into q optical signals, wherein q is a number greater than or equal to two; and q optical receiving sets for receiving a respective one of said q optical signals, each of said q optical receiving sets including,
  an optical-electrical converting portion, in said each of said q optical receiving sets, for receiving said respective one of said q optical signals from said optical branching portion, and for reconverting said respective one of said q optical signals into a second electrical signal,
  a transmission channel, in said each of said q optical receiving sets, for conveying said second electrical signal,
  a branching portion, in said each of said q optical receiving sets, for receiving said second electrical signal from said transmission channel, and for branching said second electrical signal into m branched electrical signals, wherein m is a number greater than or equal to one and less than or equal to n, and
  p electrical receiving sets, in said each of said q optical receiving sets, each of said p electrical receiving sets including,
    a demodulating portion, in said each of said p electrical receiving sets, for receiving said m branched electrical signals, and for demodulating, using carriers of a corresponding one of said p transmission sets, said m branched electrical signals to form m digital portion signals, and
    a hierarchy synthesizing portion, in said each of said p electrical receiving sets, for receiving said m digital portion signals, and for combining said m digital portion signals, such that a first to an mth digital portion signals are arranged according to said decreasing degrees of importance from said highest degree to an mth degree according to said hierarchy, to form a synthesized digital signal which represents the information of the digital signal from the corresponding one of said p channels.

18. An optical transmission system comprising:

p transmission sets for transmitting on p channels, each of said p transmission sets including,
  a hierarchy separating portion, in said each of said p transmission sets, for receiving a digital signal from a corresponding one of said p channels, wherein the digital signal represents information, and for dividing the digital signal into n digital portion signals each of which represents a respective one of a plurality of portions of the digital signal, according to a hierarchy, such that a first to an nth digital portion signals are arranged according to decreasing degrees of importance of the respective portion, from a highest degree to an nth degree, wherein n is a number greater than or equal to two, and
  a modulating portion, in said each of said p transmission sets, for receiving said n digital portion signals, and for digitally modulating n carriers with said n digital portion signals respectively, to form n digital modulation signals respectively, said n carriers each having different frequencies;

a multiplexing portion for receiving said n digital modulation signals from each of said p transmission sets, and for frequency multiplexing said n digital modulation signals to form a first electrical signal;

an electrical-optical converting portion for receiving said first electrical signal, and for converting said first electrical signal into a corresponding optical signal;

an optical transmission channel for conveying said corresponding optical signal;

an optical-electrical converting portion for receiving said corresponding optical signal from said optical transmission channel, and for reconverting said corresponding optical signal into a second electrical signal;

an electrical distributing portion for receiving said second electrical signal and for branching said second electrical signal into t distributed electrical signals, wherein t is a number greater than or equal to two; and t branch receiving sets, each of said t branching sets including, a transmission channel, in said each of said t branch receiving sets, for conveying a corresponding one of said t distributed electrical signals, a branching portion, in said each of said t branch receiving sets, for receiving said corresponding distributed electrical signal from said transmission channel, and for branching said corresponding distributed electrical signal into m branched electrical signals, wherein m is a number greater than or equal to one and less than or equal to n, and p electrical receiving sets, in said each of said t branch receiving sets, each of said p electrical receiving sets including, a demodulating portion, in said each of said p electrical receiving sets, for receiving said m branched electrical signals, and for demodulating said m branched electrical signals, using carriers of a corresponding one of said p transmission sets, to form m digital portion signals, and a hierarchy synthesizing portion, in said each of said p electrical receiving sets, for receiving said m digital portion signals, and for combining said m digital portion signals, such that a first to an mth digital portion signals are arranged according to said decreasing degrees of importance from said highest degree to an mth degree according to said hierarchy, to form a synthesized digital signal which represents the information of the digital signal from the corresponding one of said p channels.

19. An optical transmission apparatus for transmission of information on an optical transmission channel, said apparatus comprising:

a hierarchy separating portion for receiving a digital signal which represents information, and for dividing the digital signal into n digital portion signals each of which represents a respective one of a plurality of portions of the digital signal, according to a hierarchy, such that a first to an nth digital portion signals are arranged according to decreasing degrees of importance of the respective portion, from a highest degree to an nth degree, wherein n is a number greater than or equal to two;

a modulating portion for receiving said n digital portion signals, and for digitally modulating n carriers with said n digital portion signals respectively to form n digital modulation signals respectively, said n carriers each having different frequencies;

a multiplexing portion for receiving said n digital modulation signals, and for frequency multiplexing said n digital modulation signals to form an electrical signal; and an electrical-optical converting portion for receiving said electrical signal, for converting said electrical signal into a corresponding optical signal, and for outputting said corresponding optical signal onto the optical transmission channel.

\* \* \* \* \*